United States Patent
Dow et al.

(10) Patent No.: US 10,277,706 B2
(45) Date of Patent: *Apr. 30, 2019

(54) PREEMPTIVE CONTENT DISTRIBUTION

(71) Applicant: International Business Machines Corporation, Armonk, NY (US)

(72) Inventors: Andrew Dow, Laguna Niguel, CA (US); Eli M. Dow, Wappingers Falls, NY (US); Maurice M. Materise, Williamsville, NY (US); Katrin Nagel, Malsch (DE); Nickalaus A. Painter, Constableville, NY (US); Jairo A. Pava, Miramar, FL (US); Salma Y. Rodriguez, Miami, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 305 days.

This patent is subject to a terminal disclaimer.

(21) Appl. No.: 15/172,329

(22) Filed: Jun. 3, 2016

(65) Prior Publication Data

US 2017/0230476 A1   Aug. 10, 2017

Related U.S. Application Data

(63) Continuation of application No. 15/017,811, filed on Feb. 8, 2016.

(51) Int. Cl.
| | |
|---|---|
| *G06F 15/167* | (2006.01) |
| *H04L 29/08* | (2006.01) |
| *H04L 12/26* | (2006.01) |
| *H04L 12/24* | (2006.01) |

(52) U.S. Cl.
CPC ........ *H04L 67/2847* (2013.01); *H04L 41/142* (2013.01); *H04L 41/147* (2013.01); *H04L 43/04* (2013.01); *H04L 43/08* (2013.01)

(58) Field of Classification Search
CPC . H04L 67/2847; H04L 41/142; H04L 41/147; H04L 43/04
USPC .......................................................... 709/213
See application file for complete search history.

(56) References Cited

U.S. PATENT DOCUMENTS

2015/0215816 A1* 7/2015 Abou-Elkheir .............................
H04N 21/25866
370/230

OTHER PUBLICATIONS

List of IBM Patents or Patent Applications Treated as Related, Jun. 16, 2016, 2 pages.
U.S. Appl. No. 15/017,811, filed Feb. 8, 2016, Entitled: Preemptive Content Distribtuion, First Named Inventor: Andrew Dow.

* cited by examiner

*Primary Examiner* — Alan S Chou
(74) *Attorney, Agent, or Firm* — Cantor Colburn LLP; Teddi Maranzano

(57) ABSTRACT

An aspect of preemptive distribution of content includes monitoring content accessed in a local cache of a computing device. A time and a location of content accesses in the local cache are tracked. Prefetching heuristics are determined based on patterns of the time and the location of the content accesses. The prefetching heuristics are applied to speculatively prefetch additional content prior to the computing device receiving a request to access the additional content.

10 Claims, 4 Drawing Sheets

PREEMPTIVE CONTENT DISTRIBUTION

DOMESTIC PRIORITY

This application is a continuation of U.S. patent application Ser. No. 15/017,811, filed Feb. 8, 2016, the disclosure of which is incorporated by reference herein in its entirety.

BACKGROUND

The present disclosure generally relates to computer file location management, and more specifically, to preemptive distribution of content based on spatial and temporal proximity of historical media consumption.

In typical systems, a computing device connects to a server and may receive data files and other content from the server via an Internet connection. In some systems, a distributed, block-based, network cache or web cache may be used to reduce the time and bandwidth used to send content to computing devices. For example, a network cache may be located in a wireless router, or other network device. The network cache stores copies of data passing through the network cache so that subsequent requests for the data may be sent from the network cache to the requesting device(s). Furthermore, computing device users may frequently access and locally cache files related to participation in particular peer groups, such as professional teams, volunteer organizations, or hobby groups.

SUMMARY

According to an embodiment, a method of preemptive distribution of content includes monitoring content accessed in a local cache of a computing device. A time and a location of content accesses in the local cache are tracked. Prefetching heuristics are determined based on patterns of the time and the location of the content accesses. The prefetching heuristics are applied to speculatively prefetch additional content prior to the computing device receiving a request to access the additional content.

DETAILED DESCRIPTION

The embodiments described herein provide a system and method for preemptive distribution of content based on spatial and temporal proximity of historical media consumption. Embodiments enable computing devices to learn file access patterns and become proactive in fetching and caching new versions of related content. User access patterns may be observed to initiate prefetching (i.e., requesting) of content rather than preemptive pattern-triggered distribution from a source.

Embodiments can record a time and a location that caching activity took place and use this information to predict periodic data accesses. For instance, a most-recently used (MRU) stack in prefetch memory of a computing device can be used for speculative prefetching as further described herein. To provide more user flexibility and control, each computing device may configure preferences for on-demand caching and prefetching. For instance, users can specify how much memory to use for caching on their device and how much memory to use for prefetching. Prefetching heuristics can be learned from a history of cache events that is accumulated over time.

Any data that a user requests can be cached on-demand. Using a least recently used (LRU) based preference model, less frequently used data are evicted from the cache as needed. A content prefetcher can learn which data to add to prefetch memory based on time and location history. Locality hints that identify physical proximity of a computing device to other computing devices can also be used to learn which content should be prefetched. Prefetched content can be ordered sequentially to track most recently used content and to evict content that is used once (which is unlikely to be used again). Filenames can be generated by using pattern matching on expected content (e.g., sequential or time-based file naming).

When a read request is made, content is fetched and added to cache memory. Data can be evicted according to the speculative replacement policy. A recorded time and location can be used by the content prefetcher to learn what data will likely be needed in the future, allowing the content prefetcher to anticipate future caching events. Hints, such as locality patterns that intersect with the present time as well as location patterns that intersect with a user's short-term future location (e.g., if presently en route as determined using calendaring entries, etc.), can be used to increase prediction accuracy. Prefetching can improve the availability of sequential data by leveraging relative position in a sequence of accesses to determine what content will be used next in sequence. Hints for speculative prefetching can be complimentary to MRU policy decisions. For example, priority may be given to hint-based prefetching to take precedence over MRU policy decisions.

Figure 1:
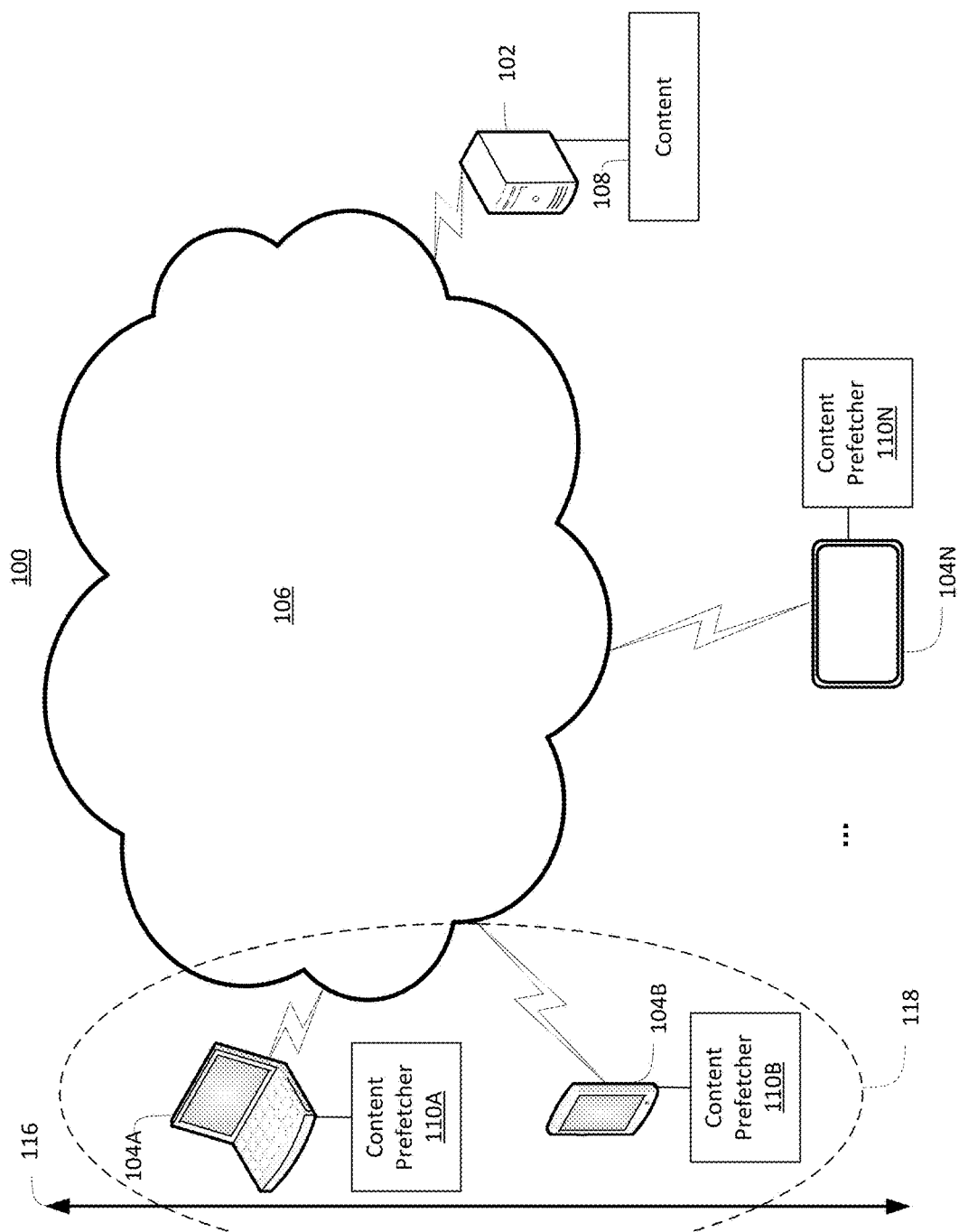
FIG. 1 illustrates a block diagram of an exemplary embodiment of a system.

Turning now to FIG. 1, an example of a system 100 upon which preemptive distribution of content may be implemented will now be described in greater detail. The system 100 represents a networked environment, such as the Internet, where messages, files, events, audio streams, video streams, and the like can be transmitted as content between one or more computing devices.

In the example depicted in FIG. 1, the system 100 includes a content server 102 and one or more computing devices 104A-N operable to communicate over a network 106. The network 106 may be any type of communications network known in the art and can include a combination of wireless, wired, and/or fiber optic links. Although only a single content server 102 and three computing devices 104A-N are depicted in FIG. 1, it will be understood that there can be any number of content servers 102 and computing devices 104A-N that can interface with each other and various networked components across the network 106. Further, one or more of the computing devices 104A-N may also be the content server 102.

In exemplary embodiments, the content server 102 and/or computing devices 104A-N can include a variety of processing devices with processing circuits and I/O interfaces, such as a keys/buttons, a touchscreen, audio input, a display device and audio output. The content server 102 and computing devices 104A-N may be embodied in any type of computer device known in the art, such as a laptop, tablet computer, mobile device, personal computer, workstation, server, and the like. Accordingly, the content server 102 and computing devices 104A-N can include various computer/communication hardware and software technology known in the art, such as one or more processing units or circuits, volatile and non-volatile memory including removable media, power supplies, network interfaces, support circuitry, operating systems, and the like.

The content server 102 can make content 108, such as one or more electronic files, available to the computing devices 104A-N. Each of the computing devices 104A-N can include a respective instance of a content prefetcher 110A-N that monitors for patterns of requests to access the content 108. When content 108 is retrieved from the content server 102 in response to a user request, it can be locally cached at each of the computing devices 104A-N. When a user subsequently requests to access the content 108, the locally cached copy of the content 108 may be used. Embodiments of the content prefetcher 110A-N can learn patterns regarding when the content 108 (which may be regularly updated or superseded) is typically accessed by users of the computing devices 104A-N and preemptively prefetch the content 108 at a future point in time such that the content 108 may already be locally available at the computing devices 104A-N prior to receiving a user-based request to retrieve the content 108. To improve prediction accuracy for prefetching, factors such as time and location of access requests of the content 108 are tracked by the content prefetcher 110A-N.

The content prefetcher 110A-N can also track local proximity of other computing devices 104A-N to infer group membership information, where members of the group may also seek to access the content 108. Group membership information can be used as another variable for pattern identification, where a substantially common group of the computing devices 104A-N is regularly at a common location and accesses the content 108 at about the same time (e.g., within 15 minutes of each other). Group members may also request or prefetch the content 108 from each other, for instance, if access to the content server 102 is unavailable prior to an expected time of access.

In the example of FIG. 1, computing devices 104A and 104B are within a physical proximity range 116 and form a group 118 at a particular moment in time. Computing device 104N may presently be outside of the physical proximity range 116 or have an activation status of sleeping or depowered. The physical proximity range 116 may define a distance or area in which computing devices 104A-N are considered to be at a same location, for instance, within a same conference room. When a user of computing device 104A attempts to access content 108, the content prefetcher 110A may track the current time and location of the computing device 104A, as well as locality data that identifies computing device 104B as being within physical proximity to the computing device 104A. At a future time, the content prefetcher 110A may identify expected content (e.g., an updated instance of content 108), an expected source (e.g., content server 102), and an expected time of access according to previous access patterns (e.g., being at a same physical location with computing device 104B at a recurring interval). The content prefetcher 110A can initiate a request from the expected source for the expected content at a predetermined time prior to the expected time of access. If the expected source is unavailable, the content prefetcher 110A may initiate a request for the expected content from another member of group 118, such as computing device 104B in this example.

Figure 2:
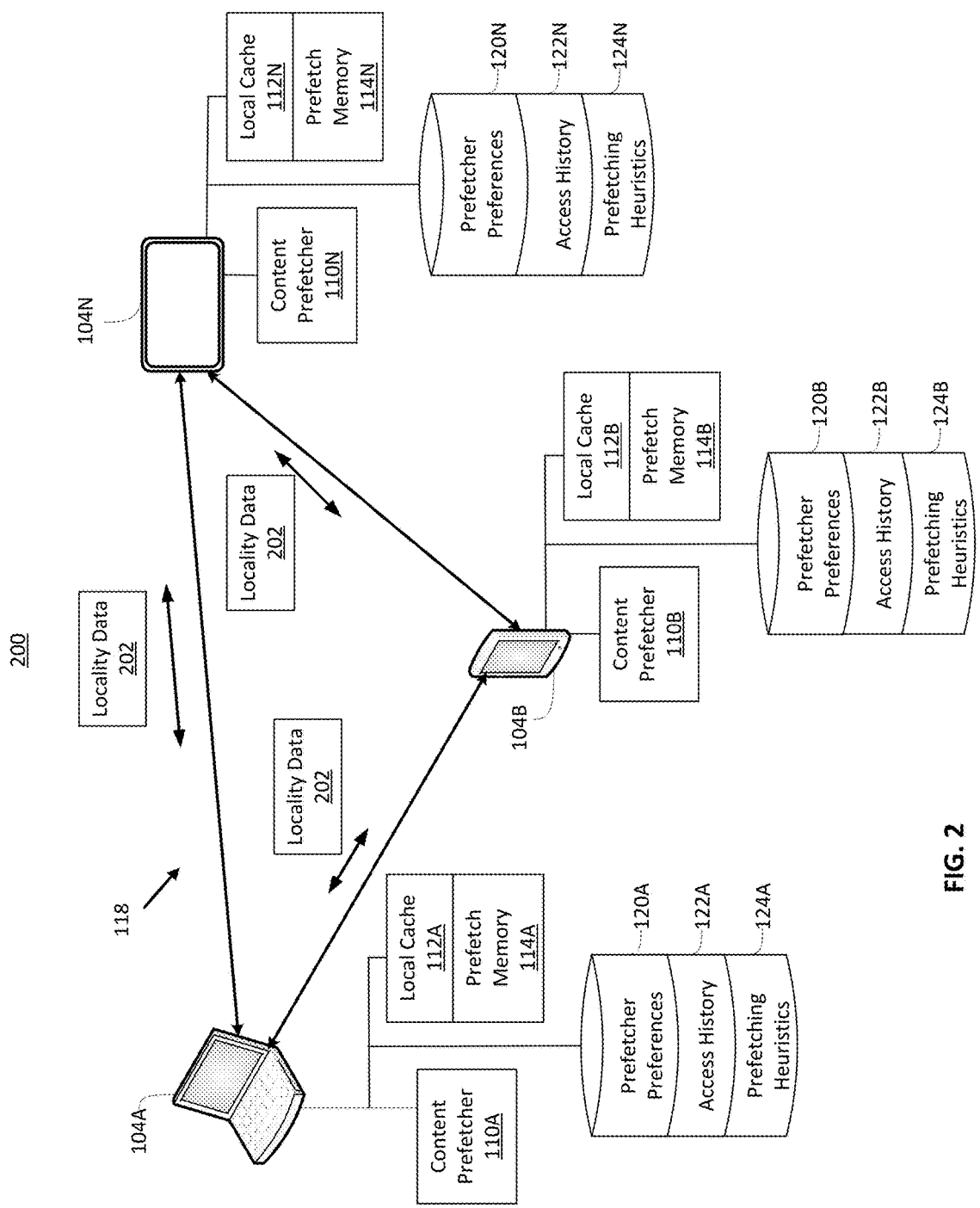
FIG. 2 illustrates a block diagram of an exemplary embodiment of a system.

FIG. 2 depicts another example of a block diagram of a system 200 upon which preemptive distribution of content may be implemented according to an embodiment. In the example of FIG. 2, the computing devices 104A-N can establish point-to-point communication to discover active members of the group 118. For instance, Bluetooth, Wi-Fi, near-field communication, and the like can be used to check for neighboring computing devices 104A-N, as well as location information and activation status. Effective range limits of the local communication interface may be used to define the physical proximity range 116 of FIG. 1, where computing devices 104A-N capable of establishing local communication are considered to be in-range. Local copies of the content 108 of FIG. 1 can be stored locally on one or more of the computing devices 104A-N in local caches 112A-N.

Each of the computing devices 104A-N can include respective instances of prefetch memory 114A-N, prefetcher preferences 120A-N, access history 122A-N, and prefetching heuristics 124A-N. Prefetcher preferences 120A-N can be customized by users of the computing devices 104A-N to set the size of local cache 112A-N, the size of prefetch memory 114A-N, and other parameters (e.g., timing constraints, file size constraints, network activity constraints, activity visibility constraints, location data tracking constraints, group membership constraints, and the like). The content prefetcher 110A-N can track access history to the local cache 112A-N and capture information such as time, location, content identifier, and group membership in access history 122A. The content prefetcher 110A-N can analyze the access history 122A-N to identify one or more patterns associated with sequences of content accesses at regular intervals. Locality data 202 may be exchanged between computing devices 104A-N in group 118. Locality data 202 can identify a geographic location of the computing devices 104A-N and may also include status/activity summary data, such as recent prefetching activities or the availability of content in local cache 112A-N.

The content prefetcher 110A-N uses the patterns identified in the access history 122A-N and/or locality data 202 to develop prefetching heuristics 124A. The prefetching heuristics 124A-N can define rules for when the content prefetcher 110A-N should initiate a request from an expected source for expected content at a predetermined time prior to an expected time of access by a user of computing devices 104A-N.

As one example, five users of computing devices 104A-N meet every Friday morning at 11:00 AM in the same conference room. Five to fifteen minutes before the meeting, the meeting chairperson typically sends copies of slides for the other users to review on computing devices 104A-N during the meeting. The slides are typically stored as electronic content having a filename of "meeting{n}", where "n" is a number or date. At the fourth meeting, the chairperson forgets to distribute the latest slides prior to the meeting and access to the chairperson's computer where the content is stored may not presently be available. However, the content prefetchers 110A-N of computing devices 104A-N were able to recognize the access pattern developed over the previous three meetings and were able to prefetch the content into prefetch memory 114A-N such that the content is locally available on the computing devices 104A-N.

As another example, a user of one of the computing devices 104A-N regularly reads from a series of documents every Thursday morning. The content prefetcher 110A-N recognizes the access pattern, noting that the metadata of the content indicates that the documents are regularly updated on Wednesday afternoons. The content prefetcher 110A-N prefetches the updated documents on Wednesday evenings and stores the content to prefetch memory 114A-N. One Thursday morning when the user is unable to establish a network connection, the user is able to access the content that was prefetched into prefetch memory 114A-N during the previous evening absent a user request.

As a further example, there can be a file that has never been used before, but group 118 has a meeting once every other month. A content prefetcher 110 may determine that the file is not important based on the access pattern alone; however, using hints retrieved from metadata via, e.g., file name pattern matching, the content prefetcher 110 can use the additional information along with spatio-temporal hints to fetch the file before access is requested.

Figure 3:
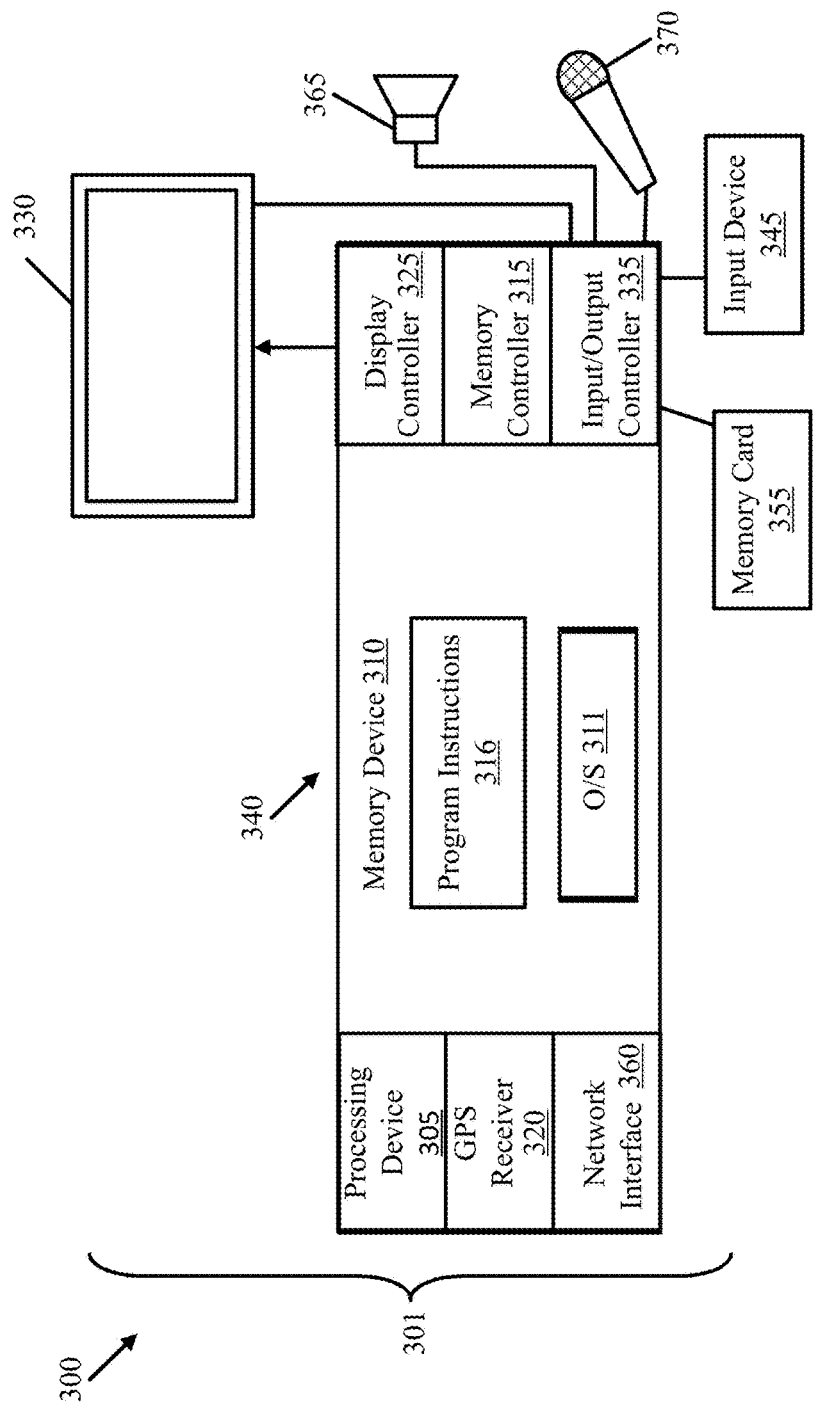
FIG. 3 illustrates a further example of a block diagram of an exemplary embodiment of a system.

FIG. 3 depicts a block diagram of a system 300 according to an embodiment. The system 300 is depicted embodied in computing device 301 in FIG. 3 as an example one of the computing devices 104A-N of FIGS. 1 and 2. It will be understood that similar features can be included in the content server 102 of FIG. 1.

In an exemplary embodiment, in terms of hardware architecture, as shown in FIG. 3, the computing device 301 includes a processing device 305 and a memory device 310 coupled to a memory controller 315 and an input/output controller 335. The input/output controller 335 can be, for example, but not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the computing device 301 may include address, control, and/or data connections to enable appropriate communications among the aforementioned components.

In some embodiments, a touch-sensitive display 330 or similar device can be coupled to the input/output controller 335. Alternatively, input may be received via a keypad, keyboard, or motion sensitive interface, depicted as input device 345. Extended storage capacity may be supported using a memory card 355 interfaced to the input/output controller 335. The input/output controller 335 may also be coupled to one or more speaker 365 and/or microphone 370. The computing device 301 can further include a display controller 325 coupled to the touch-sensitive display 330. In an alternate embodiment, a standard video display is provided in place of the touch-sensitive display 330 and other input devices 345, such as a keyboard and touchpad, are used to provide input to the computing device 301.

The processing device 305 is a hardware device for executing software, particularly software stored in memory device 310. The processing device 305 can be any custom made or commercially available computer processor, a central processing unit (CPU), an auxiliary processor among several processors associated with the computing device 301, a semiconductor-based microprocessor (in the form of a microchip or chip set), a macro-processor, or generally any device for executing instructions.

The memory device 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory device 310 may incorporate electronic, magnetic, optical, and/or other types of storage media. Accordingly, the memory device 310 is an example of a tangible computer readable storage medium 340 upon which instructions executable by the processing device 305 may be embodied as a computer program product. The memory device 310 can have a distributed architecture, where various components are situated remote from one another, but can be accessed by the processing device 305.

The instructions in memory device 310 may include one or more separate programs, each of which comprises an ordered listing of executable instructions for implementing logical functions. In the example of FIG. 3, the instructions in the memory device 310 include a suitable operating system (OS) 311 and program instructions 316. The operating system 311 essentially controls the execution of other computer programs and provides scheduling, input-output control, file and data management, memory management, and communication control and related services. When the computing device 301 is in operation, the processing device 305 is configured to execute instructions stored within the memory device 310, to communicate data to and from the memory device 310, and to generally control operations of the computing device 301 pursuant to the instructions. Examples of program instructions 316 can include instructions to implement the content prefetcher 110A-N of FIGS. 1 and 2.

The computing device 301 may also include a global position system (GPS) receiver 320. The GPS receiver 320 may be used to identify a current location of the computing device 301. An internal clock (not depicted) can also provide time of day information.

The computing device 301 also includes a network interface 360 that can establish communication channels with one or more other computer systems via one or more network links. The network interface 360 can support wired and/or wireless communication protocols known in the art. For example, when embodied in the computing device 104A-N of FIG. 1, the network interface 360 can establish communication channels with the content server 102 of FIG. 1 and/or other instances of the computing device 104A-N. The network interface 360 may also support one or more other types of networks, such as a cellular network and/or satellite communication.

Figure 4:
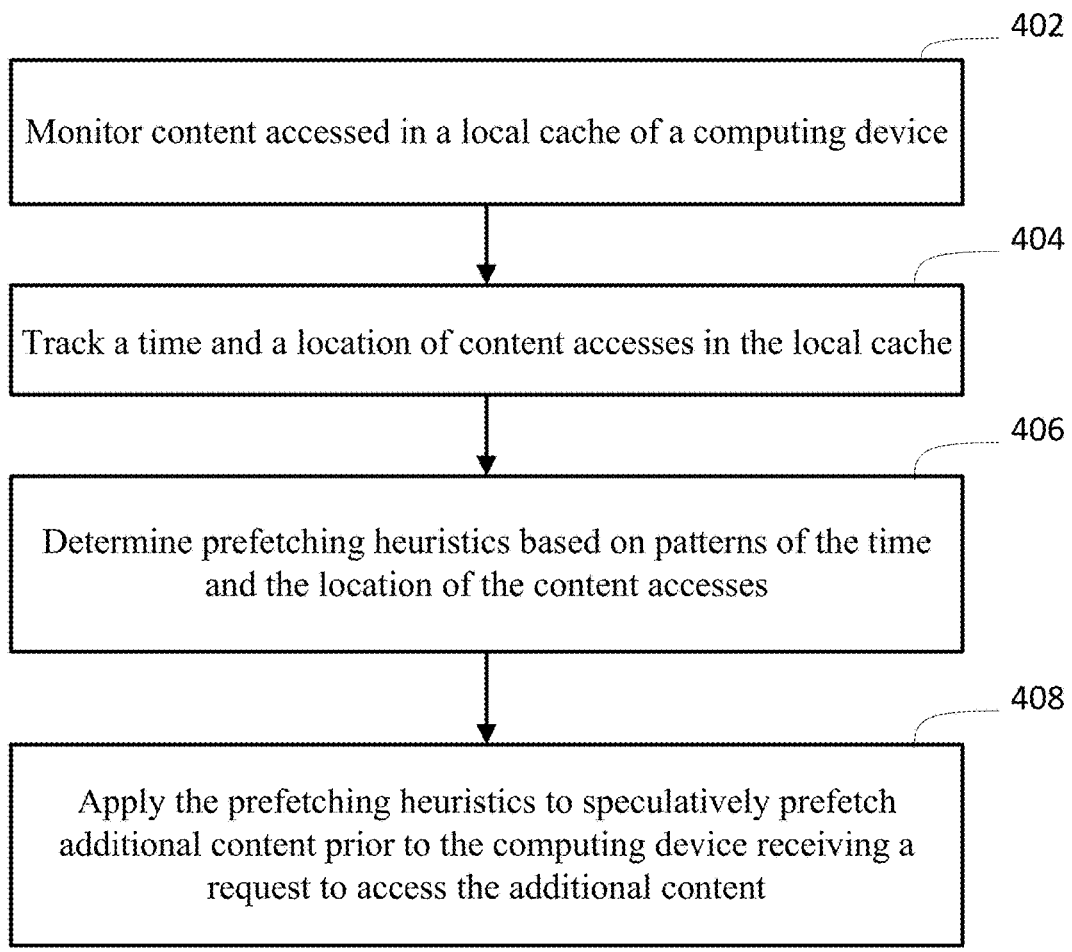
FIG. 4 illustrates a flow diagram of a process for preemptive distribution of content according to an embodiment.

Turning now to FIG. 4, a process 400 for preemptive distribution of content will be described in accordance with an exemplary embodiment. The process 400 is described in reference to FIGS. 1-4 and can be implemented by one or more of the computing devices 104A-N, and/or system 300 of FIGS. 1-3. When embodied in the computing device 301 of FIG. 3, processing device 305 can be configured to perform the process 400. For purposes of explanation, the process 400 is described as performed by computing device 104A.

At block 402, computing device 104A monitors content accessed in a local cache 112A of computing device 104A. At block 404, computing device 104A tracks a time and a location of content accesses in the local cache 112A. Locality data 202 may be received that identifies one or more other computing devices 104B-N in physical proximity to the computing device 104A. The computing device 104A can track the locality data 202 in combination with the time and the location of the content accesses. The computing device 104A may also determine membership in a group 118 of computing devices 104B—N based on the locality data 202. Tracking of the content accesses can be performed on a group basis. Tracked data can be stored in access history 122A.

At block 406, computing device 104A determines prefetching heuristics 124A based on patterns of the time and the location of the content accesses as captured in access history 122A. The computing device 104A can also incorporate patterns in the locality data 202 into the prefetching heuristics 124A.

At block 408, computing device 104A applies the prefetching heuristics 124A to speculatively prefetch additional content prior to the computing device 104A receiving a request to access the additional content.

Computing device 104A can apply a least recently used preference model to evict content from the local cache 112A as new content is received. Computing device 104A stores user requested data as the content 108 in the local cache 112A. Computing device 140A can store the additional content in prefetch memory 114A. Computing device 104A can manage the prefetch memory 114A as a most recently used stack. Entries in the prefetch memory 114A may be evicted based on identifying a most recently updated entry that has been accessed once. Speculatively prefetching the additional content can include identifying expected content, an expected source, and an expected time of access and initiating a request from the expected source for the expected content at a predetermined time prior to the expected time of access.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of preemptive distribution of content, the method comprising:
    monitoring content accessed in a local cache of a computing device;
    receiving locality data that identifies one or more other computing devices in physical proximity to the computing device;
    determining membership in a group of computing devices based on the locality data;
    tracking the locality data of the one or more other computing devices in combination with a time and a location of content accesses in the local cache on a group basis of the computing devices seeking to access common content;
    determining prefetching heuristics based on patterns of the time and the location of the content accesses;
    incorporating into the prefetching heuristics one or more patterns from the locality data comprising an intersection of the time, the location, and the one or more other computing devices in physical proximity to the computing device; and
    applying the prefetching heuristics to speculatively prefetch additional content prior to the computing device receiving a request to access the additional content.

2. The method of claim 1, further comprising:
    applying a least recently used preference model to evict content from the local cache; and
    storing user requested data as the content in the local cache.

3. The method of claim 1, further comprising:
    storing the additional content in prefetch memory of the computing device; and
    managing the prefetch memory as a most recently used stack.

4. The method of claim 3, wherein entries in the prefetch memory are evicted based on identifying a most recently updated entry that has been accessed once.

5. The method of claim 3, wherein speculatively prefetching the additional content comprises:
    identifying expected content, an expected source, and an expected time of access; and
    initiating a request from the expected source for the expected content at a predetermined time prior to the expected time of access.

6. The method of claim 1, wherein the locality data comprises a geographic location of the one or more other computing devices.

7. The method of claim 6, wherein the locality data further comprises a history of prefetching activity of the one or more other computing devices.

8. The method of claim 7, further comprising:
    speculatively prefetching the additional content from at least one of the one or more other computing devices based on determining that the history of prefetching activity includes the additional content.

9. The method of claim 6, wherein the locality data further comprises an availability status of locally cached content from the one or more other computing devices.

10. The method of claim 9, further comprising:
    speculatively prefetching the additional content from at least one of the one or more other computing devices based on determining that the locally cached content from the one or more other computing devices includes the additional content.

* * * * *